United States Patent
Brissonneau

(12)
(10) Patent No.: US 6,432,462 B2
(45) Date of Patent: *Aug. 13, 2002

(54) PRINTED DECORATIONS FOR PASTRY

(76) Inventor: Genevieve Brissonneau, 11 Rue Rabelais, 92170 Vanub (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/811,276

(22) Filed: Mar. 19, 2001

Related U.S. Application Data

(63) Continuation-in-part of application No. 09/202,685, filed on Dec. 18, 1998, now Pat. No. 6,210,731.

(51) Int. Cl.$^7$ ................................................ A23G 3/00
(52) U.S. Cl. ..................... 426/383; 426/87; 426/89; 426/95; 426/249; 426/250; 426/295; 426/306; 426/524; 101/153
(58) Field of Search .......................... 426/128, 89, 33, 426/249, 250, 289, 104, 295, 297, 306, 549, 496, 383, 385, 391, 87, 517, 524, 95, 94; 99/353, 355, 388; 101/450.1, 153

(56) References Cited

U.S. PATENT DOCUMENTS

| 2,895,832 A | * | 7/1959 | Bersey ...................... 426/383 |
| 3,503,345 A | | 3/1970 | Abrams |
| 4,087,557 A | * | 5/1978 | Barkal et al. ................ 426/548 |
| 4,285,978 A | | 8/1981 | Quinlivan |
| 5,035,907 A | * | 7/1991 | Phillips et al. .............. 426/383 |
| 5,281,433 A | * | 1/1994 | Gantwerker et al. ........ 426/544 |
| 5,431,939 A | * | 7/1995 | Cox et al. ................... 426/390 |
| 5,534,281 A | * | 7/1996 | Pappas et al. ............... 426/383 |
| 6,210,731 B1 | * | 4/2001 | Brissonneau ................ 426/383 |

FOREIGN PATENT DOCUMENTS

| BE | 1004955 A3 | 3/1993 |
| FR | 2640473 | 6/1990 |
| GB | 1073366 | 6/1967 |
| GB | 2 234422 | 2/1991 |
| IL | 79106 | 8/1990 |
| JP | 48001512 B | 8/1968 |

OTHER PUBLICATIONS

The Best of Gourmet (1996) Keitt et al.*

* cited by examiner

*Primary Examiner*—Hien Tran
*Assistant Examiner*—Hao Mai
(74) *Attorney, Agent, or Firm*—Carmen Pili Curtis

(57) ABSTRACT

The present invention relates to edible decorations which reproduce all types of patterns, including colored patterns. The purpose of these decorations is partially or totally to cover the cakes for which they are intended and with which they form a perfectly homogeneous whole. More precisely, the invention comprises in producing a printed decoration with five successive layers: a first layer of printed edible paper, and a second layer of a material for modifying the texture of the edible paper and sticking the first and third layers together. The third layer comprises of a material belonging to the group comprising almond paste and chocolate. The fourth layer is equivalent to the second layer, and the fifth layer is equivalent to the first layer. By virtue of this innovation, a printed decoration does not detract from the cake and remains supple and homogeneous.

19 Claims, No Drawings

PRINTED DECORATIONS FOR PASTRY

This application is a continuation-in-part of U.S. patent application Ser. No 09/202,685 now U.S. Pat. No. 6,210,731 filed on Dec. 18, 1998, the contents of which are incorporated herein by reference.

The present invention relates to a method of making edible decorations which reproduce all types of patterns, including colored patterns. The purpose of these decorations is partially or totally to cover the cakes with which they form a perfectly homogeneous whole. The characteristics of a printed decoration which are sought by both professionals and private individuals fall into several categories suppleness and unctuousness are necessary to enable the cake to be sliced without the cutting being hindered by the decoration; the decoration must enhance the taste and not detract from the cake; the decoration must be able to withstand freezing and be perfectly restored after thawing; the decoration must be able to be sold separately from the cake and withstand transportation without the risk of damage the decoration must be able faithfully to reproduce a colored pattern thousands of times with the fine details; and once placed on the cake, the decoration must form a perfectly homogeneous whole with the cake . No printed decoration currently in existence satisfies all these conditions. The present state of the art uses rather unpalatable edible paper and another layer of material. Patent FR 2 640 473) A (POUGHON PHILIPPE) thus relates to only two films. Thus, when the edible paper is placed as such on another layer of a material from the group comprising almond paste, chocolate, gelatin, biscuit and icing sugar, the edible paper then retains a very unpalatable stiffness. Furthermore, the edible paper will tend to crinkle and curl up onto itself. It will not tolerate freezing well.

Patent IL 79 106 A (DAVIDOR Y) also relates to only two layers: a "fondant mix", on which the decoration is printed, and an edible transparent coating. This operation is only possible because the mix is sufficiently fondant, i.e., sufficiently viscous for the transparent coating to stick to this layer. This would not be possible on an almond paste or chocolate material. The production of a decoration on a fondant mix presents problems during subsequent handling, freezing and storage at room temperature.

Patent JP 48 001 512 B (MAEDA SEIKA KK) relates to a single layer of edible paper on the side of which a logo is printed with an edible ink. This layer is then placed directly on a biscuit. The whole has to be baked in order to join the cake and this single printed layer together. In this case, the color of the biscuit is seen through the edible paper due to transparency. Furthermore, this is not possible when no baking takes place. Now, baking is not possible when the decorations are intended to be placed on a cake pastry which has already been made. The aim of the invention is to solve these problems.

The invention thus proposes a technique which enables a multicolored pattern to be reproduced faithfully, also in large sizes, without spoiling the taste of the cake.

More precisely, the invention comprises in producing a decoration comprising five successive layers. The first, second and third layers are essential for obtaining the main result sought, which is suppleness, homogeneity, keeping quality and taste. The fourth and fifth layers bring complementary advantages during the handling and packaging of the decoration. The layer sequence, starting with the upper part, which is the top of the decoration, consists of a first layer of edible paper on which a pattern is printed with an edible ink; a second layer of material belonging to the group including syrup, aqueous base and topping, which serves several purposes: it allows perfect adhesion between the first layer and the third layer of the decoration and makes the edible paper supple, thereby enabling the edible paper to integrate with the third layer, and a third layer of material comprising an edible product belonging to the group including almond paste and chocolate. The term "edible product" does not include cake batter. The third layer can be mixed with titanium dioxide beforehand. In this case, the titanium oxide makes it possible to whiten this third layer so that the colors printed on the layer of edible paper remain vivid. After a few days, the components of the decoration together form a perfectly homogeneous whole which corresponds to the desired result. To brighten the decoration, the first layer of edible paper can be covered with a light transparent topping.

A fourth layer, which is strictly identical to the second layer, is used to stick the components of the decoration comprising of the first, second and third layers to the fifth layer. The fifth layer comprises edible paper. In this way, the third layer of material belonging to the group including almond paste and chocolate, which is naturally greasy and sticky, is prevented from coming into direct contact with the packing. The decoration can thus be handled very easily. The decoration can easily be removed from its packing. The decoration is packaged in a sachet under vacuum or under a modified atmosphere, in which case, the ambient air is replaced with a gas belonging to the group including $CO_2$, nitrogen and a nitrogen/CO mixture. It is found that the product can then be stored at room temperature without deteriorating.

The layers are stuck together by a method belonging to the group including application of a mechanical pressure equally distributed over the whole of the surface, passage of the layers through a mill between two rollers, and placing of the layers under a press. It is found that this makes it possible to stick the layers to one another.

The decoration is frozen at a negative temperature by a means belonging to the group including mechanical refrigeration and cryogenics. It is found that the decoration can be stored for 18 months at a negative temperature of −18 degrees C.

The edible paper is printed by the silk screen process, by heliography, by tempography, by means of an aerograph or by the spraying of a jet of edible ink.

The use of a jet of edible ink involves filling cartridges of a traditional ink jet printer with an edible ink.

If the decoration is printed with an ink jet, the sheet of edible paper must have the maximum thickness of a normal sheet of paper accepted by an office ink jet printer. The ink cartridges are filled with an edible ink. This edible ink is manufactured from water-based food colors.

What is claimed is:

1. An edible decoration for decorating all types of fresh or frozen dry cakes comprising:
   a) a first top layer comprising a sheet of edible paper;
   b) a second middle layer comprising a material selected from the group consisting of syrup, topping and aqueous base; and
   c) a third lower layer comprising an edible product wherein said edible product does not include cake batter;
      said second layer enabling the first top layer and the third lower layer of the decoration to stick together, making the edible paper more supple and making it possible to form a homogeneous whole;
      said edible decoration having the ability to be sold separately from the cake, withstand transportation without the risk of damage and withstand freezing and be perfectly restored after thawing.

2. The edible decoration according to claim 1 wherein the edible product includes almond paste and chocolate.

3. The edible decoration according to claim 1 wherein the edible paper can comprise a pattern which is printed with an edible ink.

4. The edible decoration according to claim 3 wherein the edible paper is printed by a process selected from the group consisting of silk screen process, heliography, tempography, aerograph and spraying of a jet of edible ink.

5. The edible decoration according to claim 1, further comprising a fourth layer starting from the first top layer of the decoration, said layer including syrup, topping and aqueous base.

6. The edible decoration according to claim 5, further comprising a fifth layer of edible paper, which prevents the third lower layer which is naturally greasy and sticky, from sticking to the packing and facilitates handling of the decoration.

7. The edible decoration according to claim 1 wherein the third lower layer is further mixed with titanium oxide in an effective amount to whiten the layer and bring out the colors printed on the edible paper.

8. The edible decoration according to claim 1 wherein the first top layer is covered with a light transparent topping for brightening the decoration.

9. The edible decoration according to claim 1 wherein the decoration is packaged in a sachet under vacuum or under a modified atmosphere.

10. The edible decoration according to claim 1 wherein ambient air is replaced with a gas selected from a group consisting of $CO_2$, nitrogen and a nitrogen/$CO_2$ mixture to enable the product to be stored at room temperature without deteriorating.

11. The edible decoration according to claim 1 wherein the edible paper does not crinkle or curl up upon freezing.

12. The edible decoration according to claim 1 wherein the decoration is frozen at a negative temperature by means selected from the group consisting of mechanical refrigeration and cryogenics.

13. The edible decoration according to claim 12 wherein the decoration can be stored for 18 months at a negative temperature of −18° C.

14. The edible decoration according to claim 1 which can be stored at room temperature without deteriorating.

15. The edible decoration according to claim 1 wherein the first, second and third layers adhere to each other by applying mechanical pressure equally distributed over the whole of the surface and passing the layers through a mill between rollers and placing the layers under a press.

16. The edible decoration according to claim 1 which can reproduce all types of patterns and when placed over the cake, the decoration forms a homogeneous whole with the cake.

17. The edible decoration according to claim 1 wherein a colored pattern can be reproduced a thousand of times without spoiling the taste of the cake.

18. The edible decoration according to claim 1 which can easily be removed from its packaging.

19. The edible decoration according to claim 1 prepared by:
   a) providing a first top layer comprising a sheet of edible paper;
   b) providing a second middle layer comprising a material selected from the group consisting of syrup, topping and aqueous base which enables the first top and third lower layer of the decoration to stick together;
   c) providing a third lower layer comprising an edible product; and
   d) sticking the first, second and third layers to one another by a method selected from the group consisting of applying mechanical pressure equally distributed over the whole of the surface, passing the layers through a mill between the rollers and placing the layers under a press.

* * * * *